(12) United States Patent
Kirkpatrick

(10) Patent No.: US 8,656,315 B2
(45) Date of Patent: *Feb. 18, 2014

(54) MOVING A GRAPHICAL SELECTOR

(75) Inventor: Ficus Kirkpatrick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/250,675

(22) Filed: Sep. 30, 2011

(65) Prior Publication Data

US 2013/0036388 A1 Feb. 7, 2013

Related U.S. Application Data

(63) Continuation of application No. 13/117,924, filed on May 27, 2011.

(51) Int. Cl.
*G06F 3/033* (2013.01)

(52) U.S. Cl.
USPC ........... 715/863; 715/773; 715/856; 715/857; 715/862; 345/157; 345/159; 345/160

(58) Field of Classification Search
USPC ................................. 715/863, 773, 856, 862
See application file for complete search history.

(56) References Cited

U.S. PATENT DOCUMENTS

| | | | |
|---|---|---|---|
| 4,566,000 A | 1/1986 | Goldman et al. | |
| 5,327,161 A | 7/1994 | Logan et al. | |
| 5,523,775 A | 6/1996 | Capps | |
| 5,666,113 A | 9/1997 | Logan | |
| 5,880,411 A * | 3/1999 | Gillespie et al. | 178/18.01 |
| 5,903,229 A * | 5/1999 | Kishi | 341/20 |
| 6,286,064 B1 | 9/2001 | King et al. | |
| 6,292,179 B1 | 9/2001 | Lee | |
| 6,704,034 B1 | 3/2004 | Rodriguez et al. | |
| 6,801,190 B1 | 10/2004 | Robinson et al. | |
| 6,891,551 B2 | 5/2005 | Keely et al. | |
| 7,030,863 B2 | 4/2006 | Longe et al. | |
| 7,032,171 B1 | 4/2006 | Carroll | |
| 7,042,443 B2 | 5/2006 | Woodard et al. | |
| 7,075,520 B2 | 7/2006 | Williams | |
| 7,088,345 B2 | 8/2006 | Robinson et al. | |
| 7,098,896 B2 * | 8/2006 | Kushler et al. | 345/168 |
| 7,145,554 B2 | 12/2006 | Bachmann | |
| 7,151,530 B2 | 12/2006 | Roeber et al. | |
| 7,199,786 B2 | 4/2007 | Suraqui | |
| 7,250,938 B2 | 7/2007 | Kirkland et al. | |

(Continued)

OTHER PUBLICATIONS

Farooq et al; A Keystroke and Pointer Control Input Interface for Wearable Computers; © 2006; IEEE; 10 pages.*

(Continued)

*Primary Examiner* — Linh K Pham
(74) *Attorney, Agent, or Firm* — Shumaker & Sieffert, P.A.

(57) ABSTRACT

In general, this disclosure describes techniques for moving a graphical selector. In one example, a method includes activating, by a computing device, a graphical key that is displayed with a presence-sensitive interface of the computing device. Upon activation of the graphical key, the method also includes receiving gesture input corresponding to a directional gesture using the presence-sensitive interface of the computing device and moving a graphical selector displayed with the presence-sensitive interface from a first graphical location to a second graphical location by at least one selected increment based on a property of the gesture input.

21 Claims, 5 Drawing Sheets

(56) References Cited

U.S. PATENT DOCUMENTS

| | | |
|---|---|---|
| 7,251,367 B2 | 7/2007 | Zhai |
| 7,277,088 B2 | 10/2007 | Robinson et al. |
| 7,321,361 B2 | 1/2008 | Sato et al. |
| 7,453,439 B1 | 11/2008 | Kushler et al. |
| 7,508,324 B2 | 3/2009 | Suraqui |
| 7,571,393 B2 | 8/2009 | Premchandran et al. |
| 7,659,887 B2 | 2/2010 | Larsen et al. |
| 7,683,889 B2 | 3/2010 | Rimas Ribikauskas et al. |
| 7,706,616 B2 | 4/2010 | Kristensson et al. |
| 7,716,579 B2 | 5/2010 | Gunn et al. |
| 7,737,956 B2 | 6/2010 | Hsieh et al. |
| 7,750,891 B2 | 7/2010 | Stephanick et al. |
| 7,877,685 B2 | 1/2011 | Peters |
| 7,921,361 B2 | 4/2011 | Gunn et al. |
| 8,036,878 B2 | 10/2011 | Assadollahi |
| 8,042,044 B2 | 10/2011 | Van Leeuwen |
| 8,135,582 B2 | 3/2012 | Suraqui |
| 8,276,099 B2 | 9/2012 | Yost |
| 8,356,059 B2 | 1/2013 | Wiljanen et al. |
| 8,365,059 B2 | 1/2013 | Walsh et al. |
| 8,482,521 B2* | 7/2013 | Abe et al. ............... 345/156 |
| 2003/0068088 A1 | 4/2003 | Janakiraman et al. |
| 2003/0234766 A1 | 12/2003 | Hildebrand |
| 2005/0076300 A1 | 4/2005 | Martinez |
| 2005/0134578 A1* | 6/2005 | Chambers et al. ........... 345/184 |
| 2006/0005151 A1 | 1/2006 | Altman |
| 2006/0026535 A1* | 2/2006 | Hotelling et al. ............ 715/863 |
| 2006/0048071 A1* | 3/2006 | Jarrett et al. .............. 715/784 |
| 2006/0061557 A1 | 3/2006 | Kyrola |
| 2006/0119582 A1 | 6/2006 | Ng et al. |
| 2006/0176283 A1 | 8/2006 | Suraqui |
| 2006/0187216 A1* | 8/2006 | Trent et al. .............. 345/173 |
| 2007/0091070 A1 | 4/2007 | Larsen et al. |
| 2007/0157085 A1 | 7/2007 | Peters |
| 2007/0236475 A1* | 10/2007 | Wherry ................ 345/173 |
| 2007/0260981 A1 | 11/2007 | Kim et al. |
| 2007/0273664 A1 | 11/2007 | Kim et al. |
| 2008/0016467 A1* | 1/2008 | Chambers et al. ........... 715/835 |
| 2008/0079604 A1 | 4/2008 | Madonna et al. |
| 2008/0165142 A1 | 7/2008 | Kocienda et al. |
| 2008/0307350 A1 | 12/2008 | Sabatelli et al. |
| 2008/0316183 A1* | 12/2008 | Westerman et al. .......... 345/173 |
| 2009/0058823 A1* | 3/2009 | Kocienda .............. 345/173 |
| 2009/0064045 A1* | 3/2009 | Tremblay .............. 715/835 |
| 2009/0109182 A1 | 4/2009 | Fyke et al. |
| 2009/0178008 A1* | 7/2009 | Herz et al. ............ 715/840 |
| 2009/0189862 A1 | 7/2009 | Viberg |
| 2009/0213134 A1* | 8/2009 | Stephanick et al. .......... 345/589 |
| 2009/0228842 A1 | 9/2009 | Westerman et al. |
| 2010/0013852 A1* | 1/2010 | Liu ................ 345/592 |
| 2010/0123724 A1 | 5/2010 | Moore et al. |
| 2010/0134425 A1* | 6/2010 | Storrusten ............ 345/173 |
| 2010/0153879 A1 | 6/2010 | Rimas-Ribikauskas et al. |
| 2010/0214237 A1* | 8/2010 | Echeverri et al. .......... 345/173 |
| 2010/0235778 A1 | 9/2010 | Kocienda et al. |
| 2010/0235783 A1 | 9/2010 | Ording et al. |
| 2010/0238138 A1 | 9/2010 | Goertz et al. |
| 2010/0287486 A1* | 11/2010 | Coddington ............ 715/769 |
| 2010/0293460 A1 | 11/2010 | Budelli |
| 2011/0083105 A1* | 4/2011 | Shin et al. ............ 715/830 |
| 2011/0090151 A1 | 4/2011 | Huang et al. |
| 2011/0134068 A1 | 6/2011 | Shimoni |
| 2011/0193788 A1* | 8/2011 | King et al. ............ 345/173 |
| 2011/0231789 A1* | 9/2011 | Bukurak et al. .......... 715/773 |
| 2011/0239110 A1 | 9/2011 | Garrett et al. |
| 2011/0239153 A1* | 9/2011 | Carter et al. .......... 715/784 |
| 2011/0273379 A1* | 11/2011 | Chen et al. ........... 345/173 |
| 2011/0320978 A1 | 12/2011 | Herodezky et al. |
| 2012/0013541 A1 | 1/2012 | Boka et al. |
| 2012/0036469 A1 | 2/2012 | Suraqui |
| 2012/0139844 A1 | 6/2012 | Ramstein et al. |
| 2012/0185787 A1 | 7/2012 | Lisse et al. |
| 2012/0192117 A1* | 7/2012 | Migos et al. ............. 715/863 |
| 2012/0268387 A1 | 10/2012 | Kuo et al. |
| 2012/0306772 A1 | 12/2012 | Tan et al. |
| 2012/0311437 A1 | 12/2012 | Weeldreyer et al. |
| 2013/0002719 A1 | 1/2013 | Ide |
| 2013/0024820 A1 | 1/2013 | Kirkpatrick |
| 2013/0036388 A1 | 2/2013 | Kirkpatrick |
| 2013/0042199 A1 | 2/2013 | Fong et al. |

OTHER PUBLICATIONS

De Silva et al; Human Factors Evaluation of a Vision-Based Facial Gesture Interface; © 2003; IEEE; 8 pages.*

"BlackBerry Torch 9800 Smartphone Version 6.0 User Guide" [online]. Research in Motion Limited, Waterloo, Canada. 2010. Retrieved from the Internet: <URL:http://docs.blackberry.com/en/smartphone_users/deliverables/18577/index.jsp?name=User+Guide+-+ BlackBerry+ Torch+9800+Smartphone98006.0& language=English& userType=1& category=BlackBerry+ Smartphones& subCategory=BlackBerry+Torch> Title page, table of Contents, p. 32, and Legal Notice (15 pgs.).

U.S. Appl. No. 13/117,924, by Ficus Kirkpatrick, filed May 27, 2011.

Office Action from U.S. Appl. No. 13/117,924, dated Nov. 10, 2011, 20 pp.

Response to Office Action dated Nov. 10, 2011, from U.S. Appl. No. 13/117,924, filed Feb. 10, 2012, 17 pp.

Office Action from U.S. Appl. No. 13/117,924, dated Jun. 13, 2012, 16 pp.

"iPhone text entry," accessed on Aug. 2, 2012, 4 pp.

An Introduction to Writing Systems & Unicode, retrieved from http://rishida.net/docs/unicode-tutorial/toc, accessed on May 15, 2012, 20 pp.

Accesibility Solutions for iPhone, retrieved from http://www.apple.com/accessibility/iphone/hearing.html, accessed on Aug. 16, 2012, 4 pp.

Williams, "How to highlight, cut, copy and past using a BlackBerry Z10 smartphone," retrieved from http://helpblog.blackberry.com/2013/04/blackberry-z10-text-edit/, Apr. 10, 2013, 3 pp.

Neo, "Select, copy and past text on Android the easy way," retrieved from http://74.55.73.196/—shanzai/index.php/ guides.html?start=225, Oct. 14, 2010, 3 pp.

BlackBerry Bold 9700 Smartphone 5.0 User Guide, Typing Shortcuts, retrieved from www.blackberry.com/docs/smartphones, accessed on May 16, 2012, 1 p.

BlackBerry Bold 9700 Smartphone 5.0 User Guide, Typing Shortcuts, retrieved from www.blackberry.com/docs/smartphones, accessed on May 17, 2011, 327 pp.

BlackBerry Torch 9800 Smartphone Version 6.0, User Guide, retrieved from www.blackberry.com/docs/smartphones, accessed on Jan. 19, 2011, 302 pp.

Natasha Lomas, "Hey Apple, What the Next iPhone Really, Really Needs Is a Much Better Keyboard," http://techcrunch.com/2013104/21/the-iphone-keyboard-stinks/?, Apr. 21, 2013, 6 pgs.

U.S. Appl. No. 13/943,745, by Yu Ouyang, filed Jul. 16, 2013.

U.S. Appl. No. 13/747,214 by Yu Ouyang filed Jan. 22, 2013.

U.S. Appl. No. 13/836,242 by Yu Ouyang filed Mar. 15, 2103.

Office Action from U.S. Appl. No. 13/943,745, dated Sep. 20, 2013.

Response to Office Action from U.S. Appl. No. 13/943,745, dated Sep. 20, 2013, filed Dec. 20, 2013, 15 pp.

* cited by examiner

MOVING A GRAPHICAL SELECTOR

This application is a continuation of U.S. application Ser. No. 13/117,924, filed May 27, 2011, the entire contents of which are incorporated herein by reference.

TECHNICAL FIELD

The disclosure relates to moving a graphical selector.

BACKGROUND

Computing devices often have a display device that displays a graphical selector, such as a cursor or a pointer controlled by a mouse or other input device, which may be used to interact with other displayed elements. A user may wish to move the graphical selector to a desired location on the display device. When the display device is a presence-sensitive device, such as a touch screen, the user may attempt to move the graphical selector by placing a finger over the desired location.

SUMMARY

In one example, a method includes activating, by a computing device, a graphical key that is displayed with a presence-sensitive interface of the computing device. Upon activation of the graphical key, the method also includes receiving gesture input corresponding to a directional gesture using the presence-sensitive interface of the computing device and moving a graphical selector displayed with the presence-sensitive interface from a first graphical location to a second graphical location by at least one selected increment based on a property of the gesture input.

In another example, a tangible computer-readable medium comprising instructions for causing a programmable processor to perform operations including activating, by a computing device, a graphical key that is displayed with a presence-sensitive interface of the computing device. The instructions further include upon activation of the graphical key, receiving gesture input corresponding to a directional gesture using the presence-sensitive interface of the computing device. The instructions also include moving a graphical selector displayed by the computing device from a first graphical location to a second graphical location by at least one selected increment based on a property of the gesture input.

In yet another example, a computing device includes one or more processors. The computing device may also include an input device that receives gesture input corresponding to a directional gesture and an output device that displays a graphical selector. The computing device further includes means for moving the graphical selector from a first graphical location to a second graphical location by at least one selected increment based on a property of the gesture input.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

In accordance with common practice, the various described features are not drawn to scale and are drawn to emphasize features relevant to the present disclosure. Like reference characters denote like elements throughout the figures and text.

DETAILED DESCRIPTION

Figure 1A:
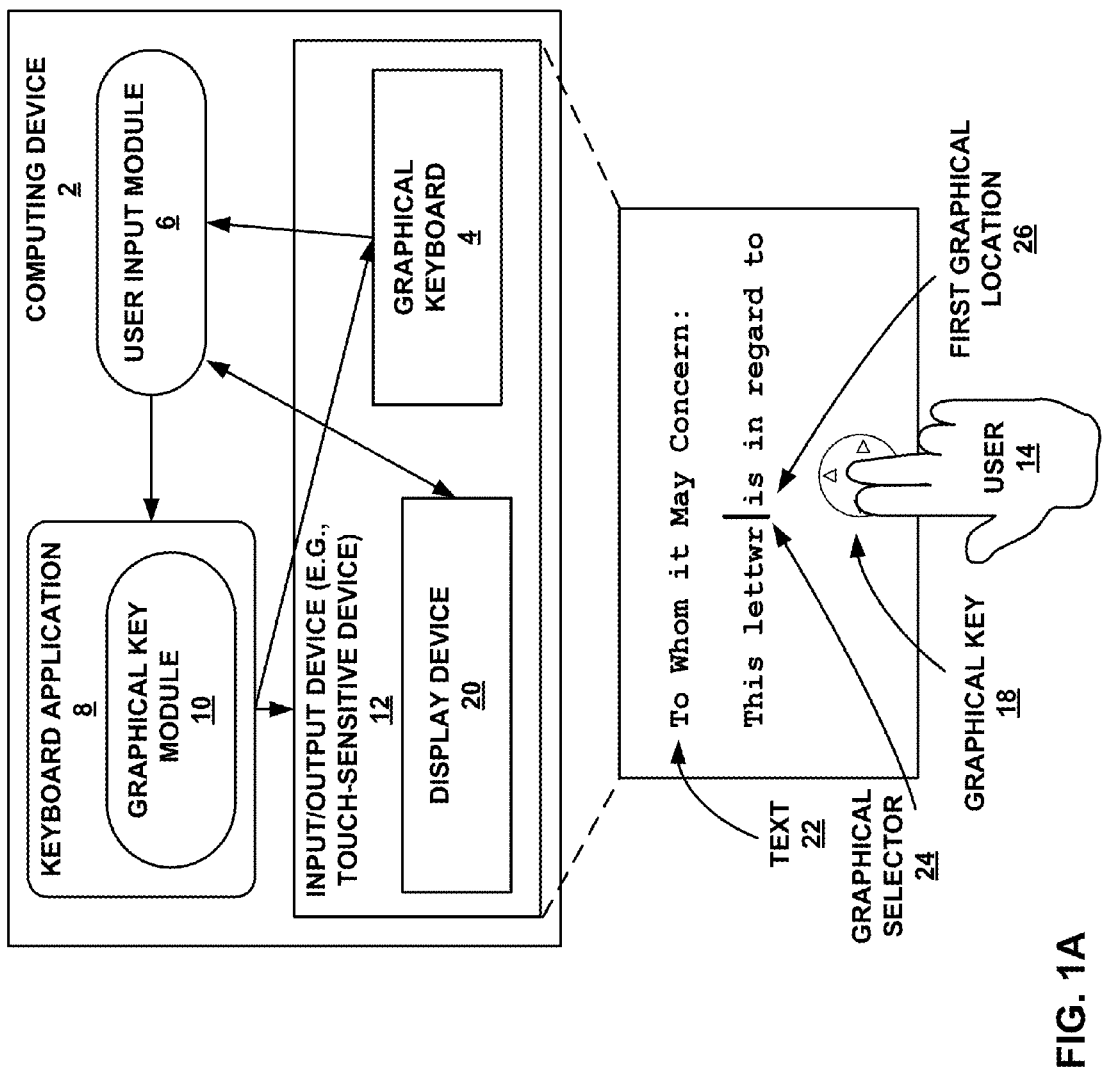
FIG. 1A is a block diagram illustrating an example of a computing device that may execute one or more applications and display a graphical key for moving a graphical selector, in accordance with one or more aspects of the present disclosure.

Techniques of the present disclosure allow a computing device to implement a graphical key on a graphical user interface (GUI) of a computing device that moves a graphical selector based on detected user gestures. In response to a swipe or fling gesture originating from the graphical key, the graphical selector (e.g., a cursor or pointer) may be moved to a new location on a display based on properties of the user gesture. The movement of the graphical selector on the display may be defined in specific increments based on properties of the gesture, which may include, for example, a duration, type, displacement, or speed of the gesture. When the computing device has a relatively small screen (such as a mobile phone, tablet computer, or other mobile device), it may be difficult for a user to to precisely pinpoint the location of the graphical selector. The present disclosure maximizes screen real estate (e.g., by reducing four or more directional arrow keys to a single graphical key) and provides more precise movement of a graphical selector on small and medium size presence-sensitive screens where user input is often provided using a finger.

For example, a user performs a swipe-left gesture, e.g., a swipe motion starting at the graphical key and moving to the left, to cause a cursor in a textual environment to move one character to the left. In another example, a fling-down gesture, e.g., a fling motion starting at the graphical key and moving downward, causes the cursor to move downward one line. In some examples, the movement of the cursor is based on or proportional to the distance traveled of the gesture, e.g., a relatively longer gesture (e.g., a length of the gesture may be equal to or more than a length threshold) moves the cursor over by an entire word while a relatively shorter gesture (e.g., a length of the gesture may be less than a length threshold) moves the cursor a single character. In other examples, the movement of the cursor is based on or proportional to the speed of the gesture, e.g., a fast upward gesture moves the cursor up to the top of a current paragraph, up to the top of a preceding paragraph, or up to the top of the textual environment. In still other examples, the magnitude of the cursor movement may be based on the duration that the user presses the graphical key before release.

This functionality may be provided via adding a graphical key to a graphical keyboard. Other examples overlay the functionality onto a pre-existing key of a graphical keyboard, for example, onto a space bar. In such examples, a tap made at the space bar adds a space to the text, while a swipe gesture performed originating at the space bar moves the cursor based on a vector (e.g., magnitude and direction) of the gesture. The present disclosure can also apply outside of the textual environment, e.g., in a pictorial context.

FIG. 1 is a block diagram illustrating an example of a computing device 2 that may execute one or more applications (e.g., keyboard application 8) and display a graphical key 18 for moving a graphical selector 24, in accordance with one or more aspects of the present disclosure. Computing device 2 may, in some examples, include, be, or be part of a portable computing device (e.g., a mobile phone, netbook, laptop, personal data assistant (PDA), tablet device, portable gaming device, portable media player, e-book reader, or a watch) as well as a non-portable device (e.g., a desktop computer). For purposes of illustration only, in this disclosure, computing device 2 is described as a portable or mobile device that a user 14 can carry, such as a laptop, smartphone, or tablet device, but aspects of this disclosure should not be considered limited to such devices. One example of computing device 2 is more fully described in FIG. 2, discussed below.

Computing device 2 may include an input/output (I/O) device 12 (e.g., a presence- or touch-sensitive device). In some examples, I/O device 12 may be a presence-sensitive screen capable of detecting gestures made proximate to the presence-sensitive screen. In other examples, I/O device 12 may be a touch-based interface capable of receiving touch input from a user 14 (e.g., touch screen, track pad, track point, or the like). In some examples, I/O device 12 may comprise a display device 20. User 14 may interact with display device 20, for example, by performing touch input on I/O device 12. For purposes of illustration only, in this disclosure, I/O device 12 is described as a touch-sensitive device 12, but aspects of this disclosure should not be considered limited to such devices. In other examples, techniques disclosed herein are applied to a presence-sensitive device.

Computing device 2 includes a user input module 6 that, when executed, may provide functionality to computing device 2 to receive and interpret user input. Computing device 2 further includes keyboard application 8 that, when executed, may provide functionality to computing device 2 to provide graphical key 18. Keyboard application 8 may also provide signals to display device 20 to display information related to gesture input. User input module 6 may also provide signals related to user input to keyboard application 8.

Figure 1B:
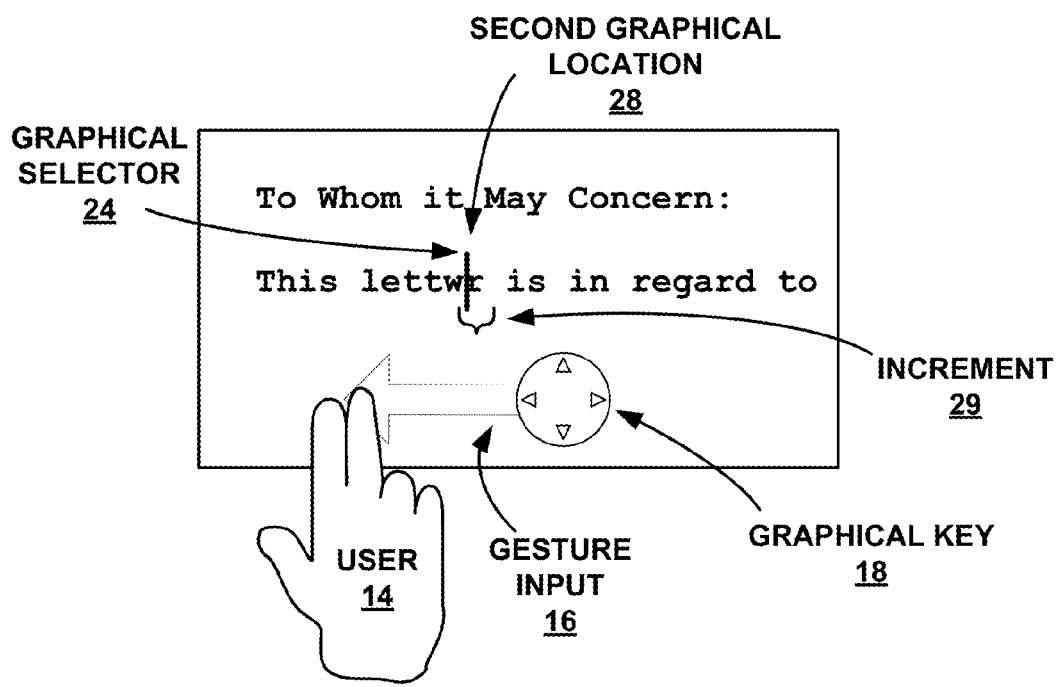
FIG. 1B is a block diagram illustrating further details of one example of the graphical key shown in FIG. 1A, in accordance with one or more aspects of the present disclosure.

Keyboard application 8 may include a graphical key module 10. Graphical key module 10, in various instances, provides computing device 2 with capabilities to display graphical key 18 that may be used to move graphical selector 24. For example, graphical key module 10 provides capabilities to move graphical selector 24 by a selected increment from a first graphical location 26 to a second graphical location 28 (as shown in FIG. 1B). In other examples, keyboard application 8 contains further modules having additional capabilities.

Display device 12 of first computing device 2 may display text 22, graphical selector 24, and graphical key 18. Graphical key 18 may be a graphical representation of a virtual button or icon, for example, a touch target. Graphical key 18 may be an image having any shape, size, coloration, or style that is displayed on display device 20. In one example, display device 20 may also display a graphical keyboard 4. In some examples, graphical key 18 is part of graphical keyboard 4. In other examples, graphical key 18 is a functionality overlaid on a pre-existing key in graphical keyboard 4. In additional examples, graphical key 18 is not part of graphical keyboard 4. In alternative examples, graphical key 18 is located at any location of display device 20. In another example, graphical key 18 is overlaid on top of graphical keyboard 4.

At least part of computing device 2 may be operating in a textual environment, for example, where display device 20 may display text 22. In such an example, graphical selector 24 may be a text cursor. As shown in FIG. 1A, user 14 may have input (e.g., via typing or handwriting), for example, the words "To Whom it May Concern: This lettwr is in regard to". User 14 may have noticed that "letter" was misspelled "lettwr" and wish to correct the error. User 14 may tap touch-sensitive device 12 in order to place graphical selector 24 next to the "w". Typically, touching anywhere in the text will relocate the graphical selector 24. However, touching touch-sensitive device 12 in order to precisely locate graphical selector 24 in order to replace the "w" with an "e" may be difficult. For example, touch-sensitive device 12 may be small relative to an input implement such as a finger, thus it is likely that graphical selector 24 may be repositioned within the vicinity of "w" instead of next to it. For example, graphical selector 24 may be placed at first graphical location 26 when user 14 taps in the vicinity of the "w" on touch-sensitive device 12.

In order to place graphical selector 24 in the desired location (in this example, on either side of the "w"), user 14 may activate graphical key 18 in order to precisely move graphical selector 24. User 14 may tap graphical key 18 to activate it, for example. Alternatively, graphical key 18 may be active at all times when it is displayed. User 14 may perform a swipe gesture originating from graphical key 18 in order to reposition graphical selector 24. As shown in FIG. 1B, user 14 performs a swipe gesture to move graphical selector 24 to the left, next to the "w".

In some examples, graphical key 18 may be displayed sometimes or at all times when operating computing device 2. In one example, graphical key 18 may only be displayed when computing device 2 is operating in an environment pertaining to the graphical key 18. For example, graphical key 18 may be displayed to move a cursor when user 14 is operating in a text-based environment. As another example, graphical key 18 may be displayed whenever graphical selector 24 is also displayed. In another example, graphical key 18 may be displayed when graphical keyboard 4 is also displayed. In yet another example, graphical key 18 may be displayed upon activation of a mode (e.g., activating a mode button) to initiate movement of graphical selector 24.

FIG. 1B is a block diagram illustrating further details of one example of graphical key 18 shown in FIG. 1A, in accordance with one or more aspects of the present disclosure. In FIG. 1B, user 14 touches graphical key 18 with a finger or other implement and drags the touch in a manner recognized by graphical key module 10 to move graphical selector 24 one character or space to the left. In this example, user 14 performs gesture input 16, which may be a swipe to the left that begins at graphical key 18. Examples of a swipe gesture may include touching touch-sensitive device 12 anywhere and dragging the touch before releasing it. Examples of a gesture input originating at graphical key 18 may include a swipe gesture that begins with a touch over graphical key 18.

Graphical key module 10 may interpret gesture input 16 as a command to move graphical selector 24 by an increment 29 to a second graphical location 28. In some examples, graphical key module 10 of keyboard application 8 may detect at least one property of gesture input 16. In another example, user input module 6 may detect at least one property of gesture input 16 and provide a signal related to the at least one property to keyboard application 8. Based on the at least one property of gesture input 16, keyboard application 8 interprets gesture input 16 as corresponding to one or more increments 29 in one or more directions. In response, keyboard application 8 may move graphical selector 24 based on the at least one property of gesture input 16.

Properties of the gesture input 16 may, for example, include a direction of the gesture input 16, a displacement of the gesture input 16, a speed of the gesture input, a width of the gesture input 16, duration graphical key 18 is pressed, or any other property. In one example where the gesture input 16 is a touch-based input, a width of the gesture input 16 may related to a length of the gesture input 16 in a direction orthogonal to a direction of a larger movement. For example, a width of a touch-based input may correspond to the width of a finger of user 14 that is making gesture input 16. For example, a width of a touch-based input from a finger may be larger than a width of a touch-based input from a stylus. In another example, the time that graphical key 18 is pressed before a fling or swipe gesture is made is used to determine how much graphical selector 24 is moved. For example, a shorter touch and fling may move graphical selector 24 a first distance, whereas a longer touch before a fling may move graphical selector 24 a second distance larger than the first distance.

In the text-based example of FIG. 1B, increment 29 may be one letter, character, or space. In other examples, increment 29 may be a word, a line, a sentence, a paragraph, a predetermined number of characters, or combinations thereof. In other environments, such as a pictorial environment, increment 29 may be another amount or quantity, for example, a pixel or a selected distance across display device 20. In some examples, increment 29 may be a specific amount in a discrete environment, for example, a space in a text-based environment or a pixel in a pictorial environment. In examples where the environment is continuous, increment 29 may not be a discrete amount, such as, for example, in a mathematical graphing environment.

Figure 2:
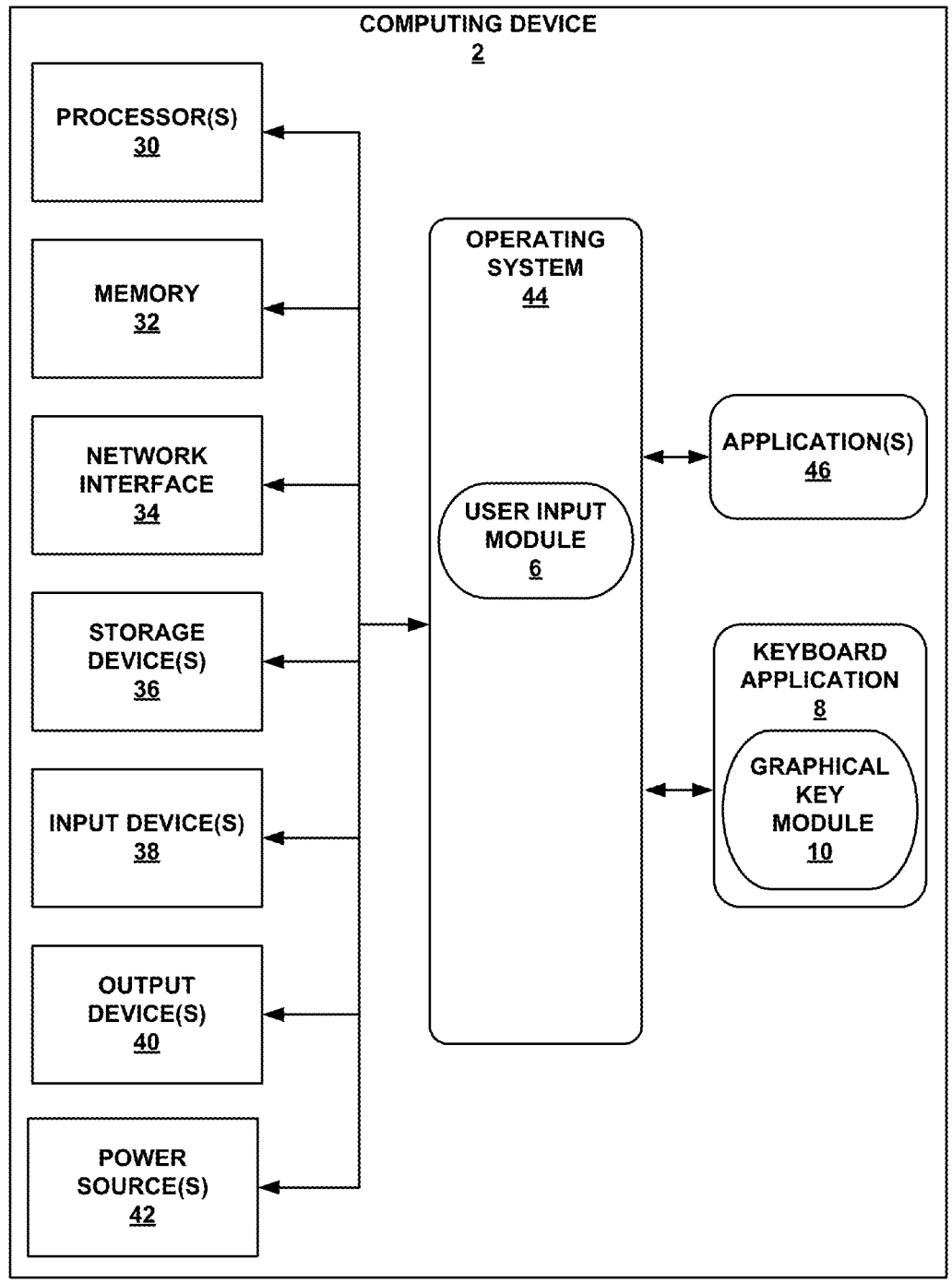
FIG. 2 is a block diagram illustrating further details of one example of the computing device shown in FIG. 1A, in accordance with one or more aspects of the present disclosure.

FIG. 2 is a block diagram illustrating further details of one example of computing device 2 shown in FIG. 1. FIG. 2 illustrates only one particular example of computing device 2, and many other example embodiments of computing device 2 may be used in other instances.

As shown in the specific example of FIG. 2, computing device 2 includes one or more processors 30, memory 32, a network interface 34, one or more storage devices 36, one or more input devices 38, one or more output devices 40, and one or more batteries or other power sources 42. Computing device 2 also includes an operating system 44, which may include user input module 6 executable by computing device 2. Computing device 2 may include one or more applications 46 and keyboard application 8. Keyboard application 8 may include graphical key module 10 executable by computing device 2. Operating system 44, applications 46, and keyboard application 8 are also executable by computing device 2. Each of components 30, 32, 34, 36, 38, 40, 42, 44, 46, 6, 8, and 10 may be interconnected (physically, communicatively, and/or operatively) for inter-component communications.

Processors 30 may be configured to implement functionality and/or process instructions for execution in computing device 2. Processors 30 may be capable of processing instructions stored in memory 32 or instructions stored on storage devices 36.

Memory 32 may be configured to store information within computing device 2 during operation. Memory 32 may, in some examples, be described as a non-transitory or tangible computer-readable storage medium. In some examples, memory 32 is a temporary memory, meaning that a primary purpose of memory 32 is not long-term storage. Memory 32 may also, in some examples, be described as a volatile memory, meaning that memory 32 does not maintain stored contents when the computer is turned off. Examples of volatile memories include random access memories (RAM), dynamic random access memories (DRAM), static random access memories (SRAM), and other forms of volatile memories known in the art. In some examples, memory 32 may be used to store program instructions for execution by processors 30. Memory 32 may be used by software or applications running on computing device 2 (e.g., one or more of applications 46) to temporarily store information during program execution.

Storage devices 36 may also include one or more non-transitory or tangible computer-readable storage media. Storage devices 36 may be configured to store larger amounts of information than memory 32. Storage devices 36 may further be configured for long-term storage of information. In some examples, storage devices 36 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In one example, storage device 36 contains a database that includes a mapping of properties of gesture inputs (such as gesture input 16) to increments (such as increment 29). In such an example, graphical key module 10 may access the database stored in storage device 36 when interpreting gesture input 16.

Computing device 2 also includes a network interface 34. Computing device 2 may utilize network interface 34 to communicate with external devices via one or more networks. In one example, network interface 34 may correspond to an interface for receiving data from computing devices (e.g., computing devices 22 and 24 of FIG. 1). Network interface 34 may be a network interface card, such as an Ethernet card, configured to communication over, for example, Ethernet, transmission control protocol (TCP), Internet protocol (IP), asynchronous transfer mode (ATM), or other network communication protocols. In other examples, network interface 34 may be an optical transceiver, a radio frequency transceiver, or any other type of device that can send and receive information.

Examples of such network interfaces 34 may include Bluetooth®, 3G and WiFi® radios in mobile computing devices as well as USB. Network interface 34 may be configured to connect to a wide-area network such as the Internet, a local-area network (LAN), an enterprise network, a wireless network, a cellular network, a telephony network, a Metropolitan area network (e.g., Wi-Fi, WAN, or WiMAX), one or more other types of networks, or a combination of two or more different types of networks (e.g., a combination of a cellular network and the Internet). In some examples, computing device 2 may utilize network interface 34 to wirelessly communicate with an external device or other networked computing device.

Computing device 2 may also include one or more input devices 38. Input device 38 may be configured to receive input from user 14 through tactile, audio, or video input. Examples of input device 38 may include a touch-sensitive display, mouse, a keyboard, a voice responsive system, a microphone, a video camera, or any other type of device for detecting a command from user 14.

One or more output devices 40 may also be included in computing device 2, e.g., display device 12. Output device 40 may be configured to provide output to user 14 using tactile, audio, or video stimuli. Output device 40 may include a touch-sensitive display, a sound card, a video graphics adapter card, or any other type of device for converting a signal into an appropriate form understandable to humans or machines. Additional examples of output device 40 may include a speaker, a cathode ray tube (CRT) monitor, a liquid crystal display (LCD), or any other type of device that can provide output to user 14.

Computing device 2 may include one or more batteries or other power sources 42, which may be rechargeable and provide power to computing device 2. The one or more batteries 42 may be made from nickel-cadmium, lithium-ion, or any other suitable material. In other examples, the one or more power sources 42 are located external to computing device 2. The one or more batteries 42 may be rechargeable and/or computing device 2 may be powered via a power connection.

Computing device 2 may include operating system 44. Operating system 44 may control the operation of components of computing device 2. For example, operating system 44 may facilitate the interaction of application 46 or keyboard application 8 with processors 30, memory 32, network interface 34, storage device 36, input device 38, output device 40, and battery 42. Examples of operating system 44 may include Android®, Apple iOS®, Blackberry® OS, Symbian OS®, Linux®, Microsoft Windows Phone 7®, or the like.

Keyboard application 8 may additionally include graphical key module 10, which may be executed as part of operating system 44. In other cases, graphical key module 10 may be implemented or executed by other components of computing device 2. Graphical key module 10 may process gesture input, e.g., gesture input 16, and may provide a graphical key 18 for display device 20 to display. Additionally, graphical key module 10 may receive input from a component such as processors 30, memory 32, network interface 34, storage devices 36, one or more output devices 40, battery 42, or operating system 44. In some cases, graphical key module 10 may perform additional processing on gesture input 16 or graphical selector 24. In other cases, graphical key module 10 may transmit input to an application, e.g., application 46, or other component in computing device 2.

Any applications, e.g., application 46 or keyboard application 8, implemented within or executed by computing device 2 may be implemented or contained within, operable by, executed by, and/or be operatively/communicatively coupled to components of computing device 2, e.g., processors 30, memory 32, network interface 34, and/or storage devices 36.

Figure 3:
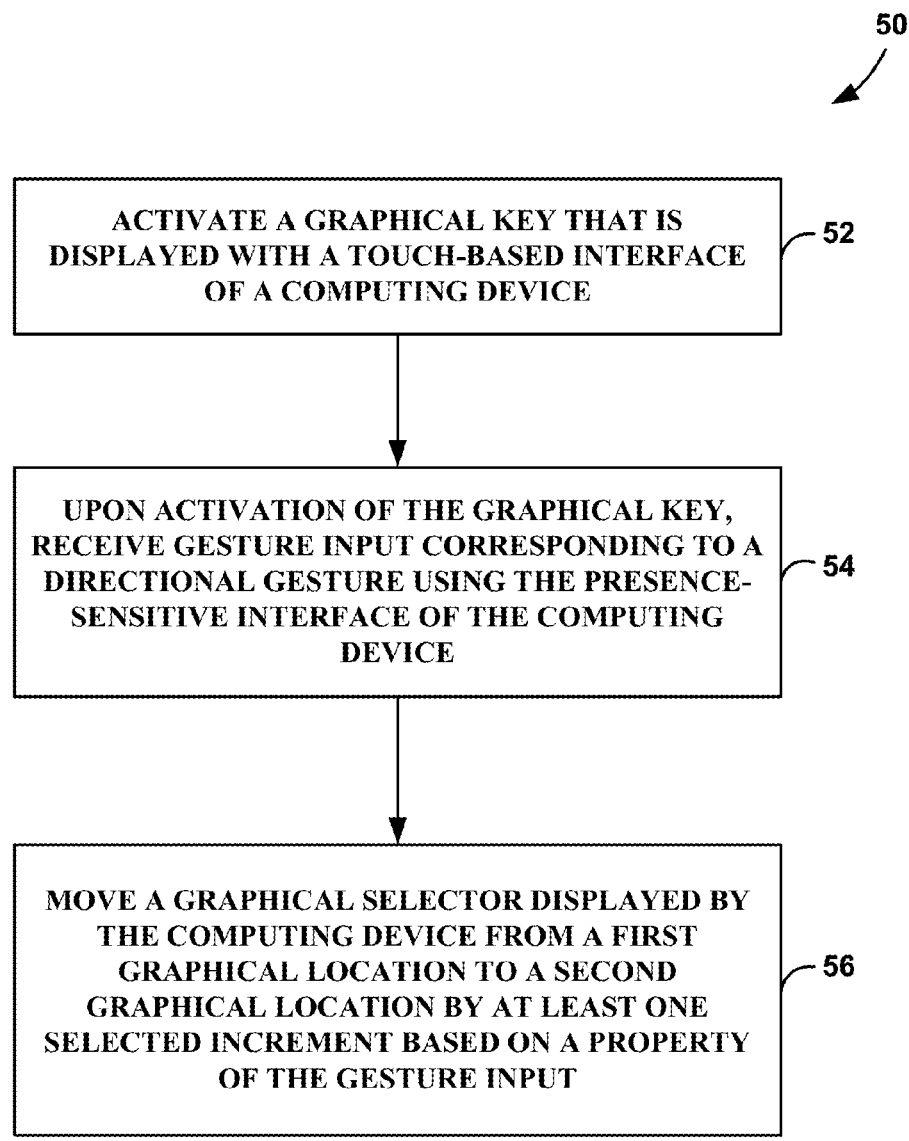
FIG. 3 is a flow chart illustrating an example method that may be performed by a computing device to provide graphical key functionality, in accordance with one or more aspects of the present disclosure.

FIG. 3 is a flow chart illustrating a example method 50 that may be performed by a computing device to provide functionality of a graphical key, in accordance with one or more aspects of the present disclosure. For example, method 50 may be performed by computing device 2 as shown in FIG. 1 or 2. In one example, method 50 may move a graphical selector by at least one increment based on at least one property of a gesture input.

Method 50 includes activating a graphical key that is displayed with a touch-based interface of a computing device (52). For example, user 14 activates graphical key 18 by touching the graphical key with a finger or other device. In one example, graphical key 18 may be deactivated when a touch that activated direction key 18 is released. In other examples, tapping graphical key 18 may activate and deactivate graphical key 18. In another example, a graphical key mode may be toggled by a swipe gesture made anywhere on display device 20 (that is, not only those originating at graphical key 18). In such an example, a swipe gesture performed anywhere on touch-based device 12 may be used to move graphical selector 24 while computing device 2 is operating in the graphical key mode. In one example, the graphical key mode may be toggled by tapping graphical key 18.

Upon activation of the graphical key, method 50 may further include receiving gesture input corresponding to a directional gesture using the touch-based interface of the computing device (54). For example, the gesture input corresponding to a directional gesture may be a swipe motion originating at the graphical key, for example, gesture input 16 originating at graphical key 18. In other examples, gesture input 16 may be a swipe motion that does not originate at graphical key 18.

Method 50 may further include moving a graphical selector displayed by the computing device from a first graphical location to a second graphical location by at least one selected increment based on a property of the gesture input (56). For example, graphical selector 24 may be moved from first graphical location 26 to second graphical location 28 based on a direction of gesture input 16. That is, the distance graphical selector 24 is moved, and in what direction graphical selector 24 is moved, may be based on one or more properties of gesture input 16. For example, as shown in FIG. 1B, gesture input 16 is a swipe gesture to the left. Therefore, graphical key module 10 moves graphical selector 24 at least one increment to the left.

For example, the property of gesture input 16 may be a direction of gesture input 16. In such an example, graphical selector 24 may be moved in a direction related to the direction of gesture input 16 (left, as shown in FIG. 1B). In other examples, graphical selector 24 may be moved in another direction based on a direction of the directional gesture, such as, but not limited to left, right, up, down, or diagonal.

In another example, a property of the gesture input 16 may be a displacement of gesture input 16. For example, the distance from a location where gesture input 16 is initiated (for example, where a touch begins) to a location where gesture input 16 is completed (for example, where the touch is released) is used to determine how far to move graphical selector 24. That is, graphical key module 10 may select which increment 29 or how many increments 29 to move graphical selector 24 by based on the displacement of gesture input 16.

For example, when the displacement of gesture input 16 is below a displacement threshold, graphical key module 10 selects an increment of a first amount. Similarly, when the displacement of gesture input 16 is equal to or above the displacement threshold, graphical key module 10 selects an increment of a second amount, wherein the second amount is larger than the first amount. For example, the displacement threshold may be set to be approximately 1 centimeter (cm). Whenever a directional gesture is less than approximately 1 cm, graphical selector 24 may be moved by one letter, space, or character in a direction corresponding to the directional gesture. In contrast, whenever a directional gesture is equal to or greater than approximately 1 cm, graphical selector 24 may be moved by one word in a direction corresponding to the directional gesture. In other examples, other increments and thresholds may be implemented.

In another example, a property of gesture input 16 may be a speed of the gesture input 16. In such an example, graphical selector 24 may be moved by a first increment when the speed of gesture input 16 is below a speed threshold and may be moved by a second increment when the speed of the gesture input 16 is above or equal to the speed threshold. In such an example, the second increment may be larger than the first increment. For example, when the speed of gesture input 16 is relatively slow, graphical selector 24 may be moved by a letter, space, character, or line in a direction corresponding to the direction of gesture input 16. Likewise, when the speed of gesture input 16 is relatively quick, graphical selector 24 may be moved by a word or paragraph in a direction corresponding to the direction of gesture input 16. In other examples, other increments and thresholds may be implemented.

In other examples, other properties of gesture input 16 may be used in determining how to move graphical selector 24. For example, which increment 29, and how many increments 29, graphical selector 24 moves may be based on the duration that user 14 presses graphical key 16 before releasing it.

In further examples, graphical selector 24 may be moved by one or more selected increments. In such an example, the number of selected increments may be proportional to at least one property of the gesture input. That is, the number of operations performed by graphical key module 10 in response to gesture input 16 may increase with the displacement of gesture input 16. For example, graphical key module 10 may move graphical selector 24 by one increment for every approximate 1 cm of displacement of gesture input 16. In such an example, when gesture input 16 corresponds to a directional gesture of approximately 4.3 cm, graphical key module 10 may move graphical selector 24 by four increments in the direction of gesture input 16. In some examples, a location of graphical selector 24 is updated real-time during performance of the directional gesture. In other examples, graphical selector 24 is not moved until completion of the directional gesture.

In some examples, a directional gesture may be fragmented into a plurality of sub-gestures. Moving the graphical selector 24 may include moving the graphical selector according to one or more properties of each sub-gesture. For example, when the directional gesture is not an approximately linear gesture input, but rather a curved input, the curve may be fragmented into approximately linear sub-gestures. Each of these sub-gestures may be treated as a separate gesture input 16. In one example, the plurality of sub-gestures is placed into a chronological order of inputs, wherein graphical selector 24 is moved sequentially in the chronological order of inputs. In another example, non-linear directional gestures may result in an approximately curving motion of graphical selector 24.

In another example, graphical key 18 may be a pre-existing key of graphical keyboard 4, wherein directional functionality is overlaid on the pre-existing key. In one example, the pre-existing key of graphical keyboard 4 may be a space bar. Activating graphical key 18 may include performing a swipe gesture originating at the space bar.

In one example, the response of graphical key 18 may be user configurable. That is, user 14 may select what properties of gesture input 16 are recognized and how those properties are used to move graphical selector 24. This user configurable information may be stored in a mapping database in storage device 36.

Figure 4:
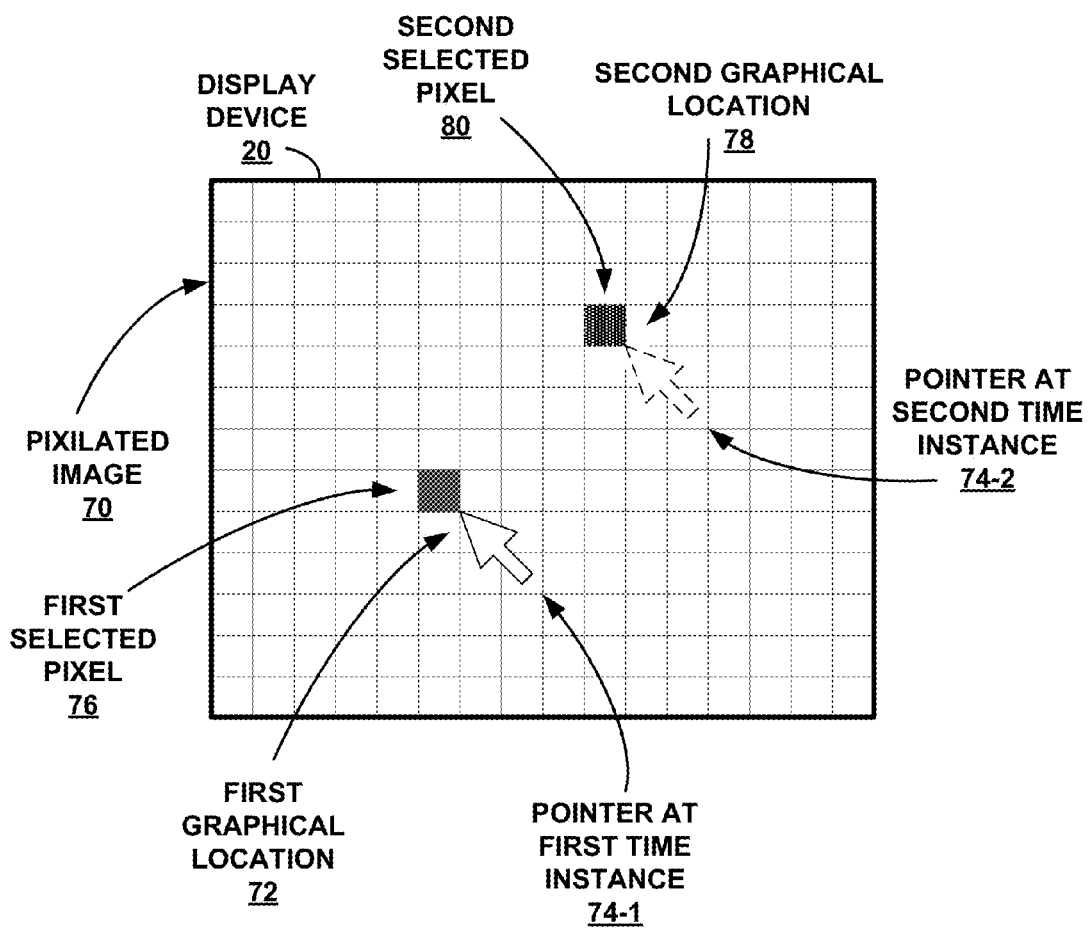
FIG. 4 is a diagram illustrating one example of a graphical selector controlled by a graphical key in an image environment, in accordance with one or more aspects of the present disclosure.

In some examples, computing device 2 may operate at least partially in a textual environment. In such a textual environment, graphical selector 24 may be a text cursor. Similarly, an increment may be one of a space, a letter, a word, a line, a sentence, a paragraph, and combinations thereof. In other examples, computing device 2 may operate at least partially in a pictorial or image environment. In such an image environment, graphical selector 24 may be a pointer. Likewise, an increment may be one of a single pixel, a selected number of pixels, a block, an image segment, and combinations thereof. FIG. 4 provides one example of graphical key functionality in a pictorial environment.

FIG. 4 is a diagram illustrating one example of a graphical selector controlled by a graphical key in an image environment, in accordance with one or more aspects of the present disclosure. In the example of FIG. 4, display device 20 may display a pixilated image 70. In this example, the graphical selector may be a pointer 74.

FIG. 4 shows at least a portion of display device 20 at two different time instances. The first time instance is indicated by the solid line of pointer 74-1 and the second time instance is indicated by the dashed line of pointer 74-2. In the first time instance, pointer 74-1 is located at first graphical location 72, and is pointing to first selected pixel 76. A user, such as user 14, activates a graphical key to move pointer 74-1 to a second geographical location 78 in the second time instance. As shown, pointer 74-2 is moved 4 pixels in an upper-right diagonal direction. Pointer 74-2 now selects second selected pixel 80.

In another example, a short or slow gesture may move pointer 74 one pixel, row, or column in a direction corresponding to the gesture, while a long or fast gesture may move pointer 74 by two or more pixels, rows, or columns in a direction corresponding to the gesture.

Techniques of the present disclosure may provide a graphical key that may be used to precisely locate a graphical selector displayed on a computing device. The graphical selector may be moved from a first graphical location to a second graphical location by at least one selected increment based on a property of a gesture input. For example, a short or slow gesture may move the graphical selector one character or line in a direction corresponding to the gesture, while a long or fast gesture may move the graphical selector one word or paragraph in a direction corresponding to the gesture. This allows a user to finely move a graphical selector, even when a touch-sensitive screen of the computing device is relatively small compared with the implement used to touch the touch-sensitive screen.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium encoded with instructions. Instructions embedded or encoded in an article of manufacture including an encoded computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may comprise one or more computer-readable storage media.

In some examples, computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various aspects of the disclosure have been described. Aspects or features of examples described herein may be combined with any other aspect or feature described in another example. These and other embodiments are within the scope of the following claims.

The invention claimed is:

1. A method comprising:
activating, by a computing device, a graphical key that comprises a touch-target representing a virtual button or icon;
upon activation of the graphical key, receiving, by the computing device, an indication of swipe gesture input corresponding to a directional swipe gesture at a presence-sensitive interface of the computing device;
determining an increment by which to move a displayed text cursor, based on one or more properties of the swipe gesture input,
wherein the one or more properties of the swipe gesture input comprise at least one of a displacement of the directional swipe gesture, a direction of movement of the directional swipe gesture, and a speed of movement of the directional swipe gesture,
wherein, when the one or more properties of the swipe gesture input comprise the speed of movement of the directional swipe gesture,
the displayed text cursor is moved the determined increment responsive to determining, by the computing device, that the speed of movement of the directional swipe gesture is below a speed threshold, and
the displayed text cursor is moved an increased increment responsive to determining, by the computing device, that the speed of movement of the directional swipe gesture is above or equal to the speed threshold, the increased increment being larger than the determined increment, and
wherein the determined increment is one of a space increment, a letter increment, a word increment, or a sentence increment; and
moving, by the computing device, the displayed text cursor from a first graphical location to a second graphical location, wherein the first graphical location and the second graphical location are separated by a distance that corresponds to the determined increment.

2. The method of claim 1, wherein the directional gesture comprises a swipe motion originating at a graphical location of the graphical key.

3. The method of claim 2, wherein
moving the displayed text cursor comprises moving the displayed text cursor in a direction related to the direction of movement of the gesture input.

4. The method of claim 1, wherein:
the determined increment comprises a first increment responsive to determining, by the computing device, that the displacement of the swipe gesture input is below a displacement threshold, and the determined increment comprises a second increment larger than the first increment responsive to determining, by the computing device, that the displacement of the gesture input is equal to or above the displacement threshold.

5. The method of claim 1, wherein:
the selected increment comprises a first increment,
the displayed text cursor is moved the first increment responsive to determining, by the computing device, that the speed of movement of the gesture input is below a speed threshold, and
the displayed text cursor is moved a second increment responsive to determining, by the computing device, that the speed of the gesture input is above or equal to the speed threshold, wherein the second increment is larger than the first increment.

6. The method of claim 1, wherein the graphical key is a pre-existing key of a graphical keyboard.

7. The method of claim 6, wherein:
the pre-existing key is a space bar, and
activating the graphical key comprises activating the graphical key responsive to receiving an indication of a swipe gesture originating at the space bar.

8. The method of claim 1, wherein activating the graphical key comprises activating the graphical key responsive to a user touching a representation of the graphical key at the presence-sensitive interface.

9. The method of claim 1, further comprising:
updating a location of the displayed text cursor in real-time while receiving the indication of the directional swipe gesture.

10. The method of claim 1, further comprising:
defining a plurality of sub-gestures based on the directional gesture,
wherein moving the displayed text cursor further comprises moving the graphical selector according to one or more properties of each sub-gesture.

11. The method of claim 10, further comprising:
ordering the plurality of sub-gestures into a chronological order of inputs,
wherein moving the displayed text cursor further comprises moving the displayed text cursor sequentially based on the chronological order of inputs.

12. The method of claim 1, further comprising:
deactivating the graphical key upon completion of the directional swipe gesture.

13. The method of claim 12, wherein the directional swipe gesture is completed when a user releases a touch from the presence-sensitive interface.

14. The method of claim 1, wherein at least one of the graphical key and the displayed text cursor is displayed at the presence-sensitive interface.

15. The method of claim 1, wherein the presence-sensitive interface comprises at least one of a presence-sensitive screen and a touch-based interface.

16. A computer-readable storage device encoded with instructions that, when executed, cause one or more processors to perform operations comprising:
activating, by a computing device, a graphical key that comprises a touch-target representing a virtual button or icon;

upon activation of the graphical key, receiving an indication of swipe gesture input corresponding to a directional swipe gesture at a presence-sensitive interface of the computing device;
determining an increment by which to move a displayed text cursor, based on one or more properties of the gesture input,
wherein the one or more properties of the swipe gesture input comprise at least one of a displacement of the directional swipe gesture, a direction of movement of the directional swipe gesture, and a speed of movement of the directional swipe gesture,
wherein, when the one or more properties of the swipe gesture input comprise the speed of movement of the directional swipe gesture,
the displayed text cursor is moved the determined increment responsive to determining, by the computing device, that the speed of movement of the directional swipe gesture is below a speed threshold, and
the displayed text cursor is moved an increased increment responsive to determining, by the computing device, that the speed of movement of the directional swipe gesture is above or equal to the speed threshold, the increased increment being larger than the determined increment, and
wherein the determined increment is one of a space increment, a letter increment, a word increment, a sentence increment; and
moving the displayed text cursor from a first graphical location to a second graphical location, wherein the first graphical location and the second graphical location are separated by a distance that corresponds to the determined increment.

17. The tangible computer-readable medium of claim 16, wherein:
wherein the displayed text cursor is moved the first increment responsive to determining, by the one or more programmable processors, that the speed of movement of the gesture input is below a speed threshold, and
the displayed text cursor is moved a second increment when responsive to determining, by the one or more programmable processors, that the speed of the gesture input is above or equal to the speed threshold, the second increment being larger than the first increment.

18. A computing device, comprising:
a memory;
one or more processors in communication with the memory; and
an input device that receives an indication of gesture input corresponding to a directional swipe gesture;
wherein the one or more programmable processors are configured to:
activate a graphical key that comprises a touch-target representing a virtual button or icon;
upon activation of the graphical key, receive an indication of swipe gesture input corresponding to a directional swipe gesture at a presence-sensitive interface of the computing device;
determine an increment by which to move a displayed text cursor, based on one or more properties of the swipe gesture input,
wherein the one or more properties of the swipe gesture input comprise at least one of a displacement of the directional swipe gesture, a direction of movement of the directional swipe gesture, and a speed of movement of the directional swipe gesture,
wherein, when the one or more properties of the swipe gesture input comprise the speed of movement of the directional swipe gesture,
the displayed text cursor is moved the determined increment responsive to determining, by the computing device, that the speed of movement of the directional swipe gesture is below a speed threshold, and
the displayed text cursor is moved an increased increment responsive to determining, by the computing device, that the speed of movement of the directional swipe gesture is above or equal to the speed threshold, the increased increment being larger than the determined increment, and
wherein the determined increment is one of a space increment, a letter increment, a word increment, a sentence increment; and
move the displayed text cursor as displayed from a first graphical location at the presence-sensitive interface to a second graphical location at the presence-sensitive interface, wherein the first graphical location is at a distance corresponding to the determined increment from the second graphical location.

19. The computing device of claim 16, wherein:
the determined increment comprises a first increment when the displacement of the swipe gesture input is below a displacement threshold, and the determined increment comprises a second increment larger than the first increment when the displacement of the swipe gesture input is equal to or above the displacement threshold.

20. The computing device of claim 18, wherein at least one of the graphical key and the displayed text cursor is displayed at the presence-sensitive interface.

21. The computing device of claim 18, wherein the presence-sensitive interface comprises at least one of a presence-sensitive screen and a touch-based interface.

* * * * *